(12) United States Patent
Dominici et al.

(10) Patent No.: US 6,243,659 B1
(45) Date of Patent: Jun. 5, 2001

(54) PEDOMETER

(76) Inventors: Carlo Maria Dominici, Via Francesco Sivori 34, 00136 Rome; Alberto Gregori, Via Quinto Novio 44, 00175 Rome, both of (IT)

(*) Notice: Subject to any disclaimer, the term of this patent is extended or adjusted under 35 U.S.C. 154(b) by 0 days.

(21) Appl. No.: 09/202,334
(22) PCT Filed: Jun. 26, 1997
(86) PCT No.: PCT/IT97/00151
§ 371 Date: Dec. 11, 1998
§ 102(e) Date: Dec. 11, 1998
(87) PCT Pub. No.: WO98/00683
PCT Pub. Date: Jan. 8, 1998

(30) Foreign Application Priority Data

Jun. 28, 1996 (IT) .............................................. RM96A0464

(51) Int. Cl.[7] .............................. G01B 11/00; G06F 15/00
(52) U.S. Cl. .......................... 702/160; 702/142; 702/149
(58) Field of Search ..................................... 702/141, 142, 702/149, 160, 96–97; 377/19, 24.2; 235/105; 340/323 R

(56) References Cited

U.S. PATENT DOCUMENTS

| | | | | |
|---|---|---|---|---|
| 4,703,445 | * | 10/1987 | Dassler | 702/160 |
| 4,736,312 | * | 4/1988 | Dassler et al. | 702/160 |
| 4,741,001 | * | 4/1988 | Ma | 702/160 |
| 5,033,013 | * | 7/1991 | Kato et al. | 702/160 |
| 5,117,444 | * | 5/1992 | Sutton et al. | 702/160 |
| 5,724,265 | * | 3/1998 | Hutchings | 702/160 |
| 6,073,086 | * | 6/2000 | Marinelli | 702/142 |

FOREIGN PATENT DOCUMENTS

| | | |
|---|---|---|
| 3514130 | 11/1985 | (DE) . |
| 0119009 | 9/1984 | (EP) . |
| 57-151807 | 9/1982 | (JP) . |

* cited by examiner

*Primary Examiner*—Marc S. Hoff
*Assistant Examiner*—Bryan Bui
(74) *Attorney, Agent, or Firm*—Stevens, Davis, Miller & Mosher, LLP

(57) ABSTRACT

An apparatus for measuring the distance covered by walking or running on foot, the apparatus comprising two complementary electronic devices, each fixed on one shoe. One of the devices, the slave unit, generates signals; the other device, the master unit, receives, stores and processes the signals to calculate speed and distance. Means for displaying the processed data are further provided.

14 Claims, 4 Drawing Sheets

PEDOMETER

CROSS-REFERENCES TO RELATED APPLICATIONS

This is the U.S. national phase filing, pursuant to 35 U.S.C. 371, of PCT/IT97/00151.

BACKGROUND OF THE INVENTION

1. Field of the Invention

The present invention relates to the measurement of the distances covered and the speeds reached by walking and/or running people.

2. Description of the Related Art

As can be easily thought, to measure the distance covered by a person moving on foot is a much more complex operation than that for measuring the distance covered and the speed reached by vehicles moving on wheels.

Some electronic, commercially available devices for sportsmen are known which are able to count the steps and to calculate, with great approximation, the distance covered.

With regard to this, it should be appreciated there is no problem in counting the steps but it is very difficult to determine the distance and the speed at which the latter is covered. It is then evident that the length of the step, i.e. the distance between the two feet of the walker, should be measured every time.

Such operation may be carried out in one of the following ways:

A) Transmission and reception of an ultrasonic signal by suitable transducers measuring the time T taken by the signal and calculating the distance S, the speed of sound being known (S=V×T; V=speed of sound).

B) Use of a radiofrequency system of very short range provided with a transmitter on one side and a receiver on the other side, both having a directional antenna. Thus a signal directly proportional to the distance is provided at the output of the receiver.

C) Measurement of a magnetic flow and detection of the distance according to the amplitude (compass principle).

D) Use of a modulated infrared transmitting-receiving system provided with an array of transmitting leds and receiving photodiodes so that the detection of the signal is made directional and then proportional to the distance.

In any case, whatever method is chosen, it is necessary to carry out some automatic compensations which are able to keep the signal constant as the outer varying conditions change. It should be noted that such changes can also be varied along the same path. In order to better explain such aspect, in case the radiofrequency system is used, it is sufficient to think to the difference between running on grass and running on reinforced concrete pavement. Actually, the reinforcement of the latter would cause an attenuation of the signal disturbing the operation of the system.

It should be noted that all of the necessary detection operations have to be synchronized with the positions of the feet (laid down or raised).

As far as the different methods mentioned above are concerned it should be noted that system A) based on the use of ultrasounds has to be discarded both because of the fragility of the transducers which cannot withstand the mechanical stress in such an application and the difficulty of protecting them from water splashes (rain, puddles, etc.).

System B) based on the use of radiofrequency signals has big application problems because it requires calibrations and is particularly sensitive to thermal variations. In order to overcome such problems it would be necessary to resort to a very expensive apparatus which would not be recommended for a commercial production.

The drawback of system C) using a magnetic flow consists in that it is strongly depending on the type of pavement on which the user runs or walks causing high variations of parameters and characteristics of the detection system.

To sum up, the method involving fewer problems of the measurement and display system is that of item D) above, i.e. that using an infrared transmitting/receiving system.

BRIEF SUMMARY OF THE INVENTION

The present invention seeks to overcome the problems mentioned above by providing a portable apparatus able to calculate with high precision the distance covered and the speed.

The apparatus according to the invention essentially consists of two separate, complementary, electronic devices, one of which (slave) is able to transmit signals through suitable transmitting means, while the other (master) is able to receive said signals through suitable receiving means and to store and to process them so as to calculate the distance covered and the average and maximum speeds.

A better understanding of the invention will ensue from the following detailed description with reference to the annexed drawings which show by way of a not limiting example a preferred embodiment.

DETAILED DESCRIPTION OF PREFERRED EMBODIMENTS OF INVENTION

Figure 1:
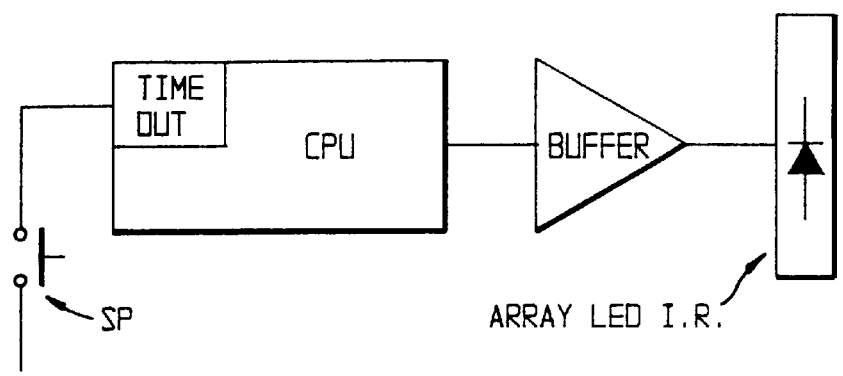
FIG. 1 is a block diagram of the slave device.
Figure 2:
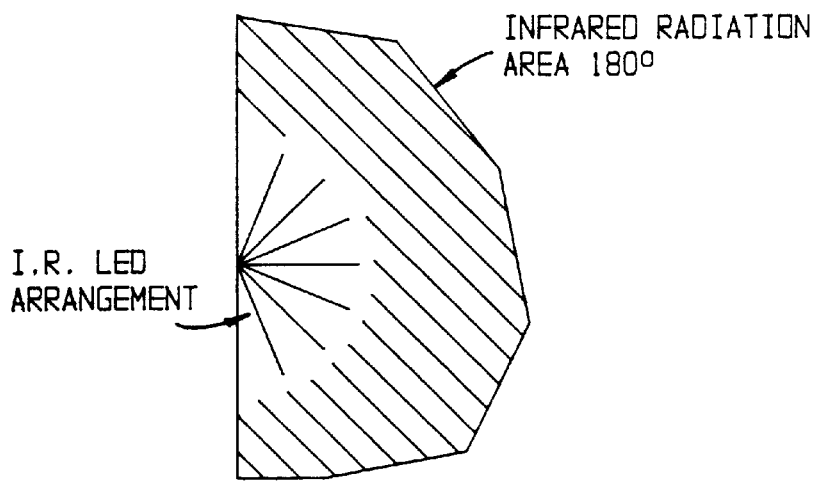
FIG. 2 is a schematic top plan view of the area swept by the infrared rays emitted by the slave.

For the sake of simplicity of description the measurement and display system is indicated at "FDM", the left foot at "lf", the right foot at "rf", the data display system at "display", and the infrared ray at "I.R.".

It is important to note that, in case the apparatus is put within shoes, the construction and the design of FDM is made depend on that the mechanical stress, to which the apparatus is subjected, causes components requiring calibration such as resistive and capacitive trimmers as well as all of the components sensitive to mechanical shocks and vibrations to be avoided.

It should also be appreciated that sharp temperature variations can occur (e.g. when the foot accidentally ends up into a water puddle with lower temperature). Therefore, the case of FDM should be watertight as well as the outer portion of the sensors should not be affected and/or damaged by even strong, and repeated water splashes.

In the present preferred embodiment the FDM consists of two complementary devices: "master" and "slave" supplied by cells and described below in their basic components.

The master essentially includes:

1) A logic unit (CPU) consisting of a microcomputer capable of mathematic calculations. The characteristics of such a component provide: a wide enough operating temperature range; a very low supply voltage (2–3 V); a very low stand-by power consumption (in the order of fractions of microampere); an interface controlling a liquid crystal display and provided with square wave generator; an analogue-to-digital converter for measuring the amplitude of the signal; a resolution of at least 8 bits; a reference voltage generator stable with temperature; a ceramic resonator oscillator (more rugged than crystal oscillator) having a frequency as near as possible the maximum allowable frequency of microcomputer and resonator.
2) A liquid crystal display for displaying data relative to distance covered, average speed, maximum speed, etc.
3) A pressure sensor for detecting the effective movement of the right foot, capable to synchronize the detection of the signal and to automatically switch on/off the apparatus.
4) An array of sensors (I.R. receivers) preferably arranged in a semicircle surrounding the inner side of the right ankle within a case for shielding them from sun's rays.
5) A filter selecting the infrared signal modulated at the output of I.R. sensors.
6) A signal amplifier, the gain of which is such as not to saturate the analogue-to-digital converter so as not to cause detection errors. This means that the maximum value of the amplified signal is always lower than or equal to the maximum value allowable by CPU. Such amplifier should have a good thermal stability and a very low power consumption (CMOS).
7) A sensor of the outer light for the automatic compensation of the signal in different hours of the day or in case of sudden crossing of dark places.

The slave essentially includes:

1) A pulse generator for supplying I.R. diodes.
2) A buffer current amplifier for controlling I.R. emitting diodes.
3) An array of I.R. emitting diodes preferably arranged in a semicircle surrounding the inner side of the left ankle.
4) A pressure sensor for switching on/off the I.R. emitting diodes.
5) A logic unit (CPU) controlling the operation of the apparatus.

With reference to the figures mentioned above, the operation of the apparatus according to the invention will now be described.

Both units (master and slave) are provided with a self-switching on/off system so as to avoid any control by the user and at the same time to optimize the cell consumption. This is accomplished by two pressure sensors SP which enable the respective unit as soon as a change of state of the sensor occurs. The enabling condition of the units is kept until a change of state of the respective sensor SP is detected within a predetermined time-out.

Therefore, as soon as the feet move both master and slave units begin their operations.

As far as the operation of the slave is concerned, any change of state of the relative pressure sensor SP causes the slave unit to leave the "sleep" state (stand-by with the minimum power consumption).

Figure 3:
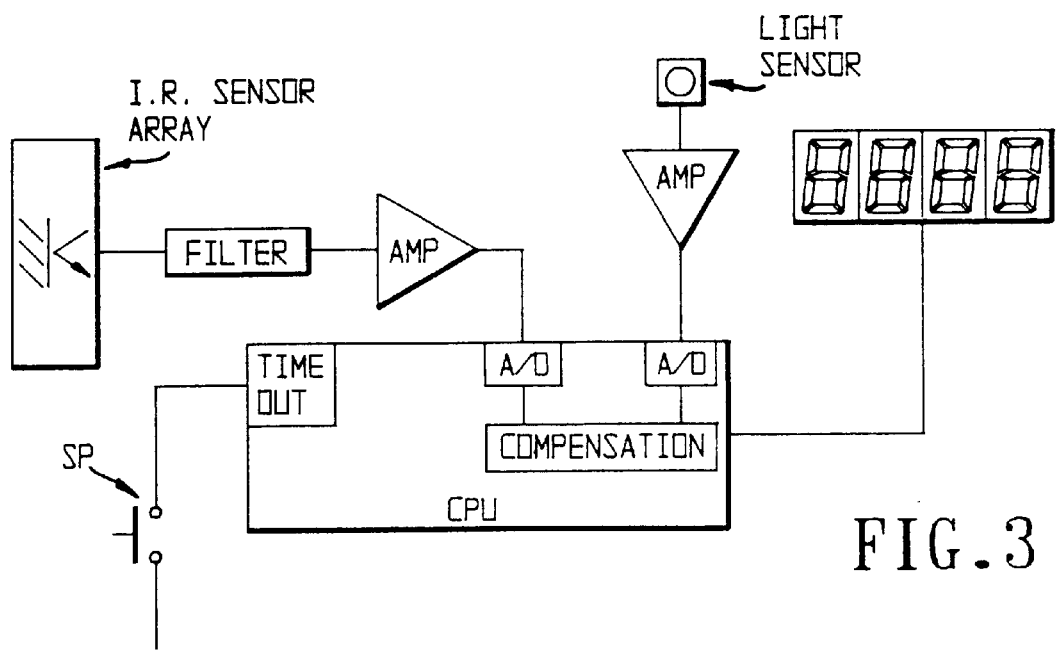
FIG. 3 is a block diagram of the master.
Figure 4:
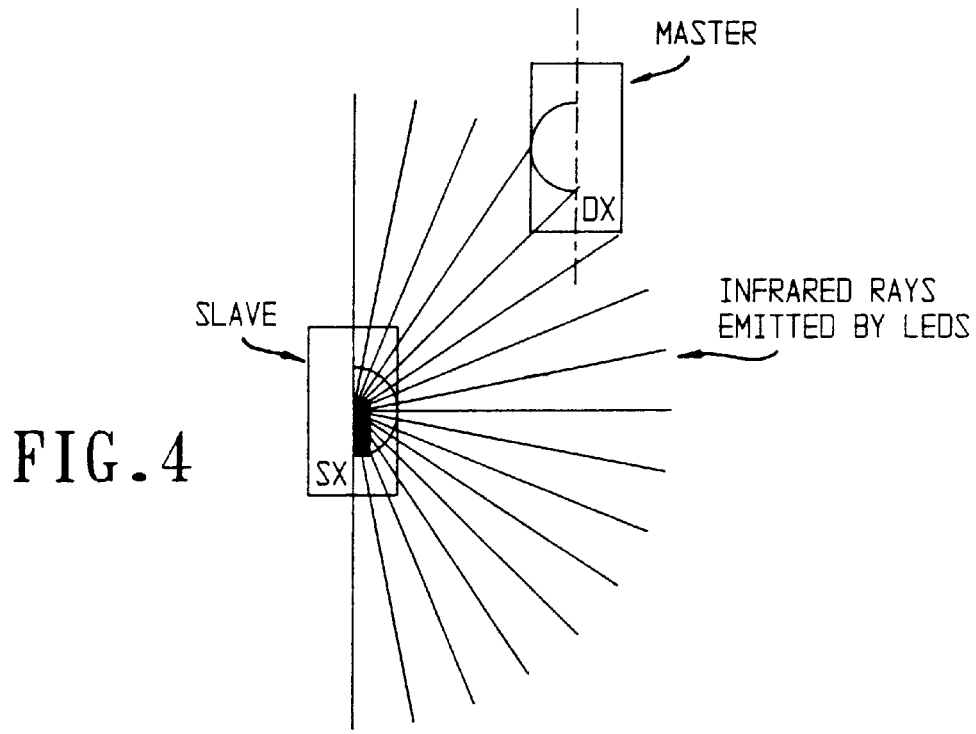
FIG. 4 shows how the infrared rays emitted by the slave are received by the master.
Figure 5:
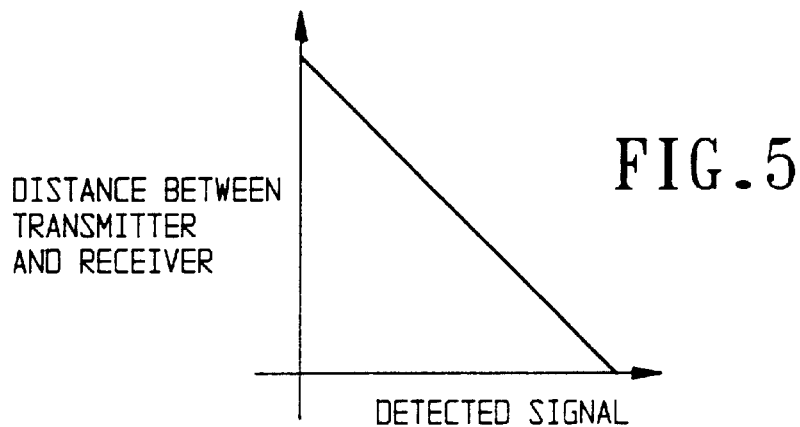
FIG. 5 is a diagram of the relation between detected signal and distance.
Figure 7:
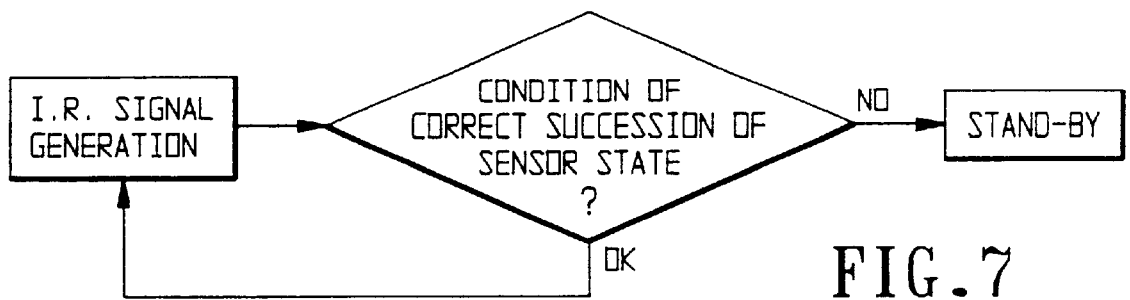
FIG. 7 is a flow diagram of the slave.
Figure 6:
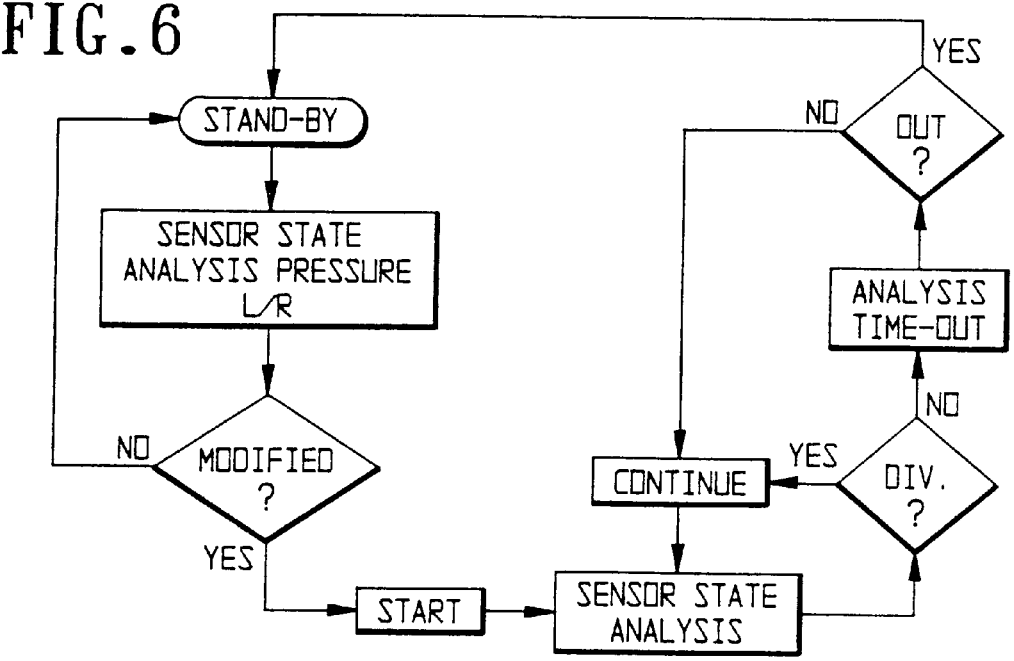
FIG. 6 is a flow diagram of the way by which the apparatus is put in/out of stand-by condition.
Figure 8:
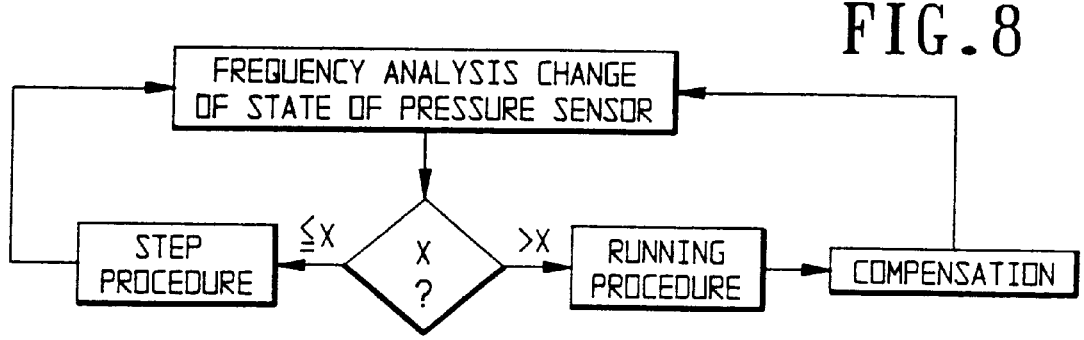
FIG. 8 is a flow diagram of the master upon detecting the walking/running.

At this time the time-out counting begins (FIG. 3), the latter being set to zero by any following change of state of pressure sensor SP, so that a signal consisting of a pulse succession amplified by the buffer amplifier is generated. Such a signal is fed to I.R. emitting diodes.

At this time a continues loop is provided, i.e. the I.R. emission carries on until the time-out procedure is started. In other words, if no change of state is detected by pressure sensor SP before the end of the counting, the unit is switched off assuming the sleep state (stand-by) of minimum power consumption.

The operation of the master unit is different because pressure sensor SP has a double function. Actually, in addition to cause the apparatus to leave the sleep state, such sensor synchronizes the time in which the modulated infrared signal from the slave is detected.

Also in this case the return of the apparatus to the sleep state (low consumption) occurs when no change of state is carried out by pressure sensor SP within a determined time-out.

Figure 9A:
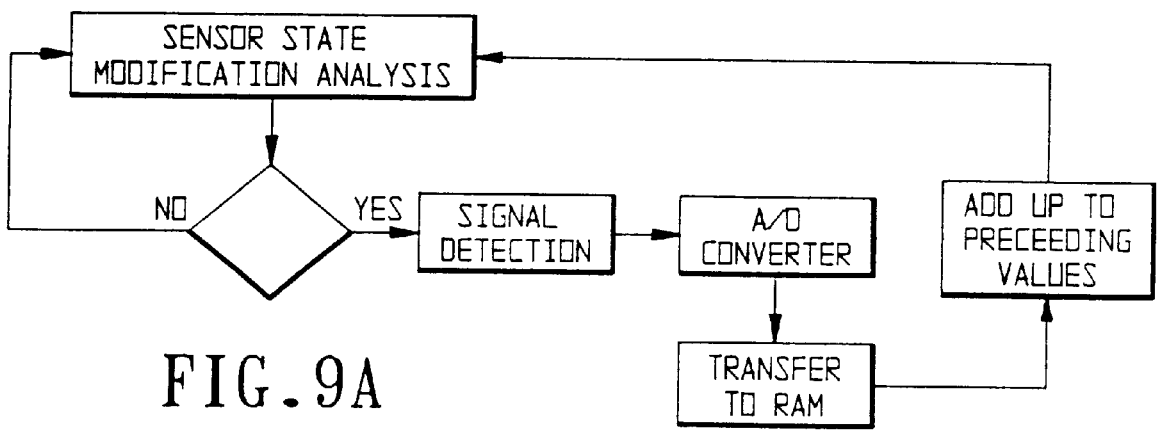
FIG. 9A is a flow diagram of the master upon detecting and storing the distance when walking in step.
Figure 9B:
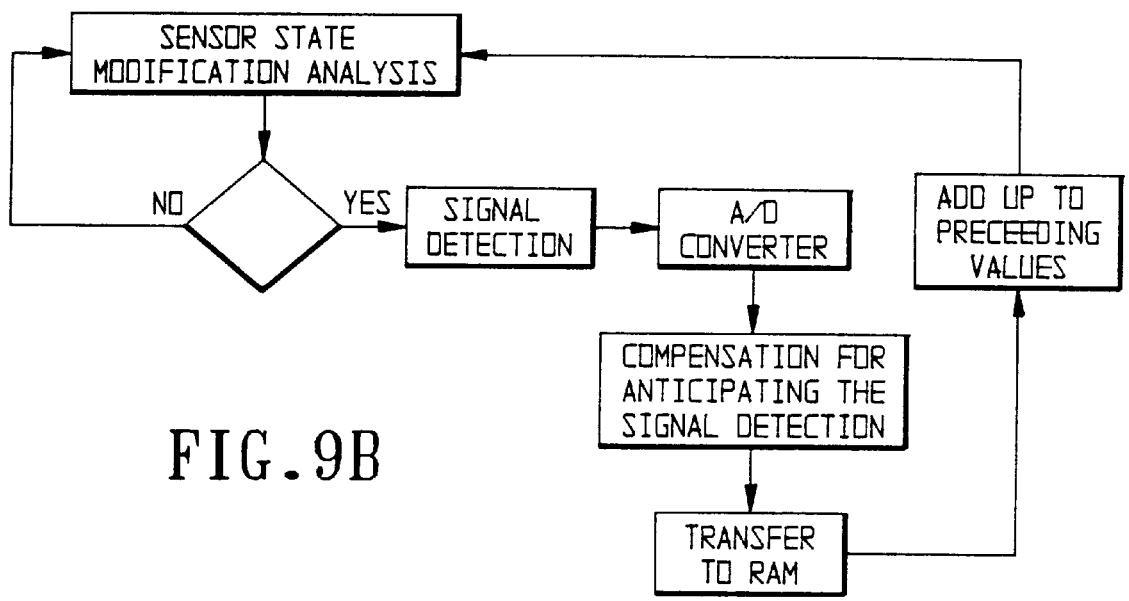
FIG. 9B is a flow diagram of the master upon detecting and storing the distance when running.
Figure 10:
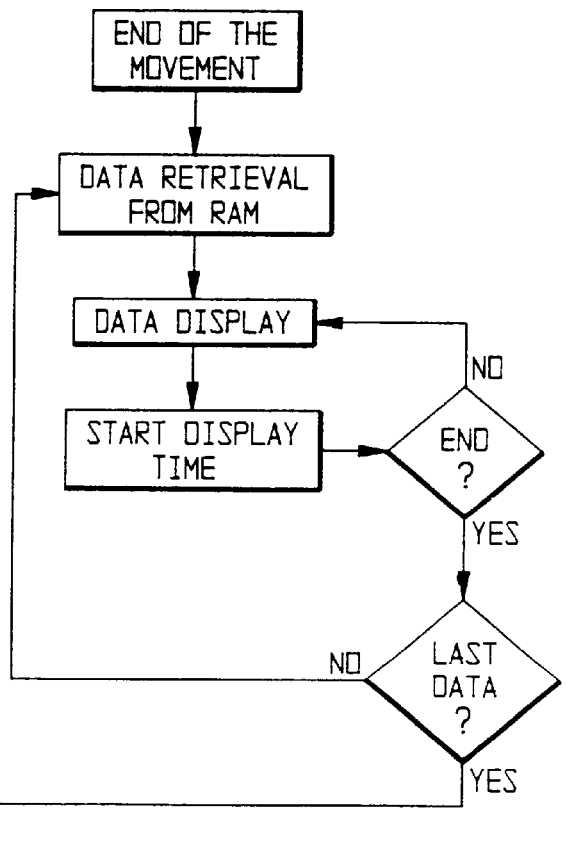
FIG. 10 is a flow diagram of the master upon displaying detected data.

In order to simplify FIGS. 9A and 9B the succession of changes of state of pressure sensor SP is assumed to be free of time-out as accepted by the system. It should be appreciated that the succession of foot movements is different according to the way of walking: going in step or running.

In the described preferred embodiment the slave unit is put in the left shoe, while the master unit is put in the right shoe. In case of marching in step there is a succession of states which can be represented as shown in the following table.

|  | LF | RF | STATE |
| --- | --- | --- | --- |
| I | 0 | 0 | STILL |
| II | 1 | 0 | MOVEMENT |
| III | 0 | 1 | MOVEMENT |
| IV | 0 | 0 | STILL |

The first state takes place at the beginning of the movement when the feet are still and laid down.

The second state takes place when the left foot is raised to start walking. At this time sensor pressure SP changes its state and causes the slave unit to operate and to emit an infrared signal Which is kept also when the foot is laid down again.

The third state takes place after the end of the step of the left foot and the following raising of the right foot which causes the master unit to operate. Under such conditions the master unit operated by the change of state of pressure sensor SP detects the I.R. signal and stores a digit according to the amplitude of the latter.

The master unit detects the signal at any change of state of its pressure sensor, i.e. both upon raising and laying down the right foot.

In case the reverse succession takes place, i.e. the right foot is raised first, there are no problems because in this case the master unit is already operating when raising the left foot and then detects the modulated I.R. signal as soon as the slave unit starts the emission of the same.

The master unit processes then the amplitude of the I.R. (analogue) signal, converts it into a digital signal which is compared with a reference voltage, and calculates a binary digit between 0 and 255. The measurement error is lower than 4/1000 (1/255=0.00392) of the maximum length of the step.

Thus the obtained binary digit is stored in a register (FIGS. 9A and 9B). The following detected values will be added up to the preceding values and, when the maximum capacity of the register is reached, the following registers representing tens, hundreds, and thousands are increased.

When the master unit returns to stand-by, data relative to the total distance covered, the average and maximum speeds are automatically displayed. In order to perform such operations, the master unit compares the stored binary digits with a conversion table included in its operation program. Such data are stored in the memory and can be increased by next movements or can be reset by a reset button.

In case the user is running, there is one more succession of states in the table shown above. Actually it should be considered the situation in which both feet are raised. Moreover, the feet can rotate backwards upon running with the result of a masking of the I.R. signal. The master unit is able to evaluate whether the user is walking or running (FIG. 9) by only detecting the succession and the frequency of the changes of state of its pressure sensor. In such case, the signal measurement process is started in advance with respect to the time in which the right foot (where the master unit is installed) is laid down again. The amount of such a time in advance is proportional to the speed and can change every moment. Actually, the measurement is carried out before the foot rotates backwards. The same will take place before the foot is raised. The measurement of the signal is made in advance with respect to the time in which the right foot is raised from the ground. In other words, the time in advance in which the modulated I.R. signal is detected during the run is calculated by CPU according to the frequency of laying down/raising the foot to which the master unit is connected and depending on data stored in the memory and/or the program of CPU.

A second embodiment of the invention further provides a calculation of the calories consumed by the user along a predetermined path. As the calorie consumption depends on the weight of the user, the distance covered, and the speed at which such a distance has been covered, the master unit also provides a weight sensor such as a load cell able to evaluate the weight of the user. The CPU of the master unit calculates the calories employed during the walking and/or the run by comparing the detected weight, the distance covered, and the speed with its own data stored in the memory of the calculation program. Such beforehand obtained data (e.g. during experimentations) provide the calorie consumption according to the weight and the parameters of the motor-action. In order to reduce the amount of such stored data and then the mass of the memory of the apparatus, it can also be provided an algorithm which calculates the calorie consumption by interpolating a lower data amount.

The present invention is described and illustrated according to some preferred embodiments thereof, however, it should be understood that those skilled in the art can make modifications and replacements without departing from the scope of the present industrial invention.

What is claimed is:

1. An apparatus for measuring the distance covered by walking or running on foot adapted to be put within shoes or a portable case, comprising two separate, complementary electronic devices supplied by cells, wherein one of said devices is a slave unit fixed on one shoe and is capable of generating signals through suitable emitting means, while the other of said devices is a master unit fixed on another shoe, and is capable of receiving said signals through suitable receiving means, and of storing and processing said signals so as to convert said signals into a binary code, in so doing being capable of calculating a runner's or pedestrian's completed distance and average and maximum speeds, and automatically displaying the distance and speeds, said signals being modulated and directional so that the extent to which they are received by the master unit is proportional to the distance between the emitting and receiving means, wherein means for displaying the processed data are further provided.

2. The apparatus of claim 1, wherein the emitting slave unit which is fixed on one shoe and the receiving master unit which is fixed on the other shoe, are provided with automatic self-switching means comprising logic units (CPU) activated by pressure sensors (SP), such that when a change of state of said sensors occurs, the apparatus is enabled for a predetermined length of time, after which the units automatically switch off, to avoid any control by the user and at the same time to minimize consumption of the power supply cells.

3. The apparatus for measuring the distance covered by walking or running according to claim 1, wherein there are provided means for the conversion of the signal into a digital signal once received by the master unit and for its comparison with a reference voltage, a binary digit between 0 and 255 being obtained and stored in a register, said register adding it up to the values previously stored until when it has been filled, and other registers being provided to load the following binary digits, the data relative to the overall distance covered, to the average and maximum speed being automatically displayed immediately after the receiving master unit returns to stand by exactly when the runner or pedestrian stops running or walking, respectively.

4. The apparatus for measuring the distance covered by walking or running according to claim 1, wherein the registers are in increasing order and represent units, tens, hundreds and thousands.

5. The apparatus of claim 1, wherein said directional signals are modulated infrared rays.

6. The apparatus of claim 1, wherein said emitting means are infrared transmitting leds and said receiving means are receiving photodiodes.

7. The apparatus of claim 1, wherein the emitting slave unit comprises:
   a pulse generator feeding pulse signals to I.R. emitting leds;
   a buffer current amplifier for controlling the I.R. emitting leds;
   an array of I.R. emitting leds preferably arranged in a semicircle surrounding the inner side of the left ankle within a case;
   a pressure sensor (SP) capable to switch on/off the emission of I.R. rays;
   a logic unit (CPU) for controlling the operation of the apparatus; and
the receiving master unit comprises:
   a logic unit (CPU) comprising a microcomputer capable of mathematic calculations and adapted to control a display;
   a liquid crystal display for displaying data relative to at least the parameters of distance covered, average speed, and maximum speed;
   a pressure sensor (SP) for detecting the effective movement of the right foot, capable to synchronize the detection of the signal and to automatically switch on/off the apparatus;

an array of sensors comprising I.R. receivers arranged in a semicircle surrounding the inner side of the right ankle within a case for shielding them from sun's rays;

a filter selecting the infrared signal modulated at the output of I.R. sensors;

a signal amplifier, the gain of which is such that the maximum value of the amplified signal is always lower than or equal to the maximum value allowable by CPU so as not to saturate the analogue-to-digital converter and to avoid detection errors;

a sensor of the outer light for the automatic compensation of the signal in different hours of the day or in case of sudden crossing of dark places.

8. The apparatus of claim 1, wherein said logic unit (CPU) of the receiving master unit provides:

a wide enough operating temperature range; a very low supply voltage of 2–3 V; a very low stand-by power consumption in the order of fractions of microampere; an interface controlling a liquid crystal display and provided with square wave generator; an analogue-to-digital converter for measuring the amplitude of the signal; a resolution of at least 8 bits; a reference voltage generator stable with temperature; a ceramic resonator oscillator more rugged than crystal oscillator having a frequency as near as possible the maximum allowable frequency of microcomputer and resonator.

9. The apparatus of claim 1, wherein said amplifier has a good thermal stability and a very low power consumption (CMOS).

10. The apparatus of claim 1, wherein the logic unit of the master unit is able to discriminate whether the user is walking or running from data detected by the pressure sensor, and in case the user is running, the detection of the signals received by the photodiodes is started in advance with respect to both the time in which the foot is laid down and the time in which the foot is raised.

11. The apparatus of claim 10, wherein the amount of such a time in advance is calculated by the logic unit (CPU) of the receiving master unit by comparing the detected data with those stored in its control program.

12. The apparatus of claim 1, wherein the receiving master unit further provides a weight sensor such as a load cell able to evaluate the weight of the user, the logic unit thereof having also a program for calculating the calorie consumption according to the weight, the distance covered, and the speed.

13. The apparatus of claim 12, wherein the calculation of the calorie consumption is carried out by comparing the detected data with those stored in the calculation program.

14. The apparatus of claim 13, wherein said calculation program includes a data interpolation algorithm able to reduce the amount of stored data and then the request of memory in the logic unit.

* * * * *